US012307925B2

(12) United States Patent
Dixon et al.

(10) Patent No.: US 12,307,925 B2
(45) Date of Patent: May 20, 2025

(54) HYBRID HEAT TRANSFER LABEL ASSEMBLIES

(71) Applicant: Illinois Tool Works Inc., Glenview, IL (US)

(72) Inventors: Lee R. B. Dixon, Newcastle Upon Tyne (GB); Carlos Altamirano, East Hartford, CT (US); Luigi Filippino, Padua (IT); Michael B. Colella, Southington, CT (US); Trinh Truong, Manchester, CT (US); Emma Bleszinski, Hartford, CT (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 18/017,286

(22) PCT Filed: Jul. 29, 2021

(86) PCT No.: PCT/US2021/043599
§ 371 (c)(1),
(2) Date: Jan. 20, 2023

(87) PCT Pub. No.: WO2022/026641
PCT Pub. Date: Feb. 3, 2022

(65) Prior Publication Data

US 2023/0274663 A1 Aug. 31, 2023

Related U.S. Application Data

(60) Provisional application No. 63/059,421, filed on Jul. 31, 2020.

(51) Int. Cl.
*G09F 3/02* (2006.01)
*B41F 17/00* (2006.01)
(Continued)

(52) U.S. Cl.
CPC ................ *G09F 3/02* (2013.01); *B41F 17/00* (2013.01); *B41J 3/4075* (2013.01); *G09F 3/10* (2013.01);
(Continued)

(58) Field of Classification Search
CPC .................................... G09F 3/04; G09F 3/02
See application file for complete search history.

(56) References Cited

U.S. PATENT DOCUMENTS

RE28,732 E * 3/1976 von Hofe ................. B65C 9/44 156/64
5,667,614 A 9/1997 Stahl
(Continued)

FOREIGN PATENT DOCUMENTS

CN 1204374 A 1/1999
CN 1741862 A 3/2006
(Continued)

OTHER PUBLICATIONS

International Preliminary Report on Patentability mailed Feb. 9, 2023 for corresponding International Application No. PCT/US2021/043599 (8 pages).
(Continued)

*Primary Examiner* — Dah-Wei D. Yuan
*Assistant Examiner* — Andrew J Bowman
(74) *Attorney, Agent, or Firm* — The Small Patent Law Group LLC; Christopher R. Carroll

(57) ABSTRACT

A hybrid heat transfer label assembly and method for producing the label assembly are provided. The label assembly includes a carrier layer, a non-digitally printed protective layer disposed above the carrier layer, a digitally printed layer disposed above the non-digitally printed protective layer, and a non-digitally printed layer disposed above the digitally printed layer. The non-digitally printed protective
(Continued)

layer, the digitally printed layer, and the non-digitally printed layer form a label that is configured to separate from the carrier layer and adhere to an article upon application of heat to the carrier layer.

13 Claims, 6 Drawing Sheets

(51) Int. Cl.
*B41J 3/407* (2006.01)
*G09F 3/10* (2006.01)

(52) U.S. Cl.
CPC ................ *G09F 2003/0202* (2013.01); *G09F 2003/0225* (2013.01); *G09F 2003/025* (2013.01); *G09F 2003/0257* (2013.01)

(56) References Cited

U.S. PATENT DOCUMENTS

| | | | | |
|---|---|---|---|---|
| 5,691,437 | A * | 11/1997 | Main | G09F 3/10 283/81 |
| 5,919,834 | A | 7/1999 | Downs et al. | |
| 7,195,811 | B2 | 3/2007 | Franke | |
| 8,382,164 | B2 | 2/2013 | Gibb et al. | |
| 9,275,560 | B2 | 3/2016 | Zhang et al. | |
| 9,701,153 | B2 | 7/2017 | Chiao et al. | |
| 9,799,238 | B2 | 10/2017 | Daley et al. | |
| 10,596,789 | B2 | 3/2020 | Tsai et al. | |
| 2003/0091799 | A1 | 5/2003 | Franke | |
| 2003/0135938 | A1 | 7/2003 | Tyler et al. | |
| 2003/0152722 | A1 * | 8/2003 | Fearn | G09F 3/02 428/40.1 |
| 2007/0009732 | A1 | 1/2007 | Tsai et al. | |
| 2012/0040154 | A1 | 2/2012 | Dinescu et al. | |
| 2013/0287972 | A1 * | 10/2013 | Tetrault | G09F 3/04 428/32.6 |
| 2014/0356592 | A1 | 12/2014 | Colella | |
| 2019/0378438 | A1 | 12/2019 | Penrose et al. | |

FOREIGN PATENT DOCUMENTS

| | | | | | |
|---|---|---|---|---|---|
| CN | 1922644 | A | | 2/2007 | |
| DE | 10249131 | A1 | * | 5/2004 | C09F 3/02 |
| EP | 0492258 | A1 | | 7/1992 | |
| JP | 2002019390 | | * | 1/2002 | B41J 2/01 |
| JP | 2002019390 | A | | 1/2002 | |
| WO | 2004050262 | A1 | | 6/2004 | |
| WO | WO2004/050262 | | * | 6/2004 | B05D 5/10 |
| WO | 2008053202 | A2 | | 5/2008 | |
| WO | 2011091817 | A1 | | 8/2011 | |

OTHER PUBLICATIONS

International Search Report and Written Opinion mailed Nov. 16, 2021 for corresponding International Application No. PCT/US2021/043599 (14 pages).

* cited by examiner

HYBRID HEAT TRANSFER LABEL ASSEMBLIES

CROSS-REFERENCE TO RELATED APPLICATIONS

This application is a national stage entry of International Patent Application No. PCT/US2021/043599 (filed 29 Jul. 2021), which claims priority to U.S. Provisional Patent Application No. 63/059,421 (filed 31 Jul. 2020). The entire disclosures of these applications are incorporated herein by reference.

BACKGROUND

Technical Field

The subject matter described herein relates to labels that can be transferred to surfaces using application of heat or a combination of heat and pressure.

Discussion of Art

Labels having indicia and/or graphics are used in the garment industry to decorate clothing articles and/or to mark the articles (e.g., to identify the manufacture, size, washing instructions, etc.). These labels may be used with durable goods as well.

Heat transfer labels including graphics and/or markings may be made using screen printing, flexographic printing, gravure printing, or rotogravure priming processes. These printing processes use ink and heat activated adhesive systems that can provide necessary properties for heat transfer labels, such as adhesion to a target article, and other chemical and environmental resistance properties.

Digital printing can provide superior quality graphics than the above printing processes with tight tolerances, fine details, and multi-color capabilities. Further, digital printing can allow for variable data to be easily printed onto articles (e.g., personalized information that is different for different articles), as digital printing does not require pre-fabricated printing plates.

Some heat transfer labels are hybrid labels that combine non-digital printing processes (e.g., screen printing, flexographic printing, or rotogravure priming processes) and digital printing processes to create the labels. These labels may have a carrier layer with a digitally printed layer (e.g., images and/or indicia) on the carrier layer, a polymeric coating layer on the digitally printed layer, and adhesive(s) on the coating layer. The coating layer and/or adhesive(s) can be printed using a non-digital printing process, while an image and/or indicia in the digitally printed layer may be printed using a digital printer. The label can be transferred to an article (e.g., a garment) by placing the adhesive against the article and applying heat or heat and pressure to separate the digitally printed layer and the protective layer from the carrier layer. The adhesive secures the digitally printed layer and the coating layer to the article.

For example, one known heat transfer label may include a carrier paper formed by paper coated with silicone, a screen printed protective coating on the carrier paper (e.g., formed from Estane 5703 polyurethane/cellulose ester resin blend), a barcode printed on the protective coating (e.g., a black-and-white RICOH variable barcode printed using polyester dry toner resin), two screen printed backup layers on the barcode (e.g., two layers of Estane 5703 polyurethane/cellulose ester resin blend that forms white layers), and three layers of screen printed adhesive layers on the screen print backup layers (e.g., formed from a co-polyamide/polyurethane resin dispersion blend).

One issue with these types of hybrid labels is that the digitally printed layer may be susceptible to damage or other effects after transfer to the article. This can deteriorate the appearance of the image and/or indicia. Another issue with these types of hybrid labels is that dyes within the article may seep into the label and interfere with the appearance of the image and/or indicia.

BRIEF DESCRIPTION

In one embodiment, a hybrid heat transfer label assembly is provided. The label assembly includes a carrier layer, a non-digitally printed protective layer disposed above the carrier layer, a digitally printed layer disposed above the non-digitally printed protective layer, and a non-digitally printed layer disposed above the digitally printed layer. The non-digitally printed protective layer, the digitally printed layer, and the non-digitally printed layer form a label that is configured to separate from the carrier layer and adhere to an article upon application of heat to the carrier layer.

A method for producing a hybrid heat transfer label assembly also is provided. The method includes printing a protective layer above a carrier layer using a first non-digital printer, digitally printing a digitally printed layer above the non-digitally printed protective layer, and printing a non-digitally printed layer above the digitally printed layer using the first non-digital printer or a second non-digital printer. The protective layer, the digitally printed layer, and the non-digitally printed layer form a label that is configured to separate from the carrier layer and adhere to an article upon application of heat to the carrier layer.

In another embodiment, another method for producing a hybrid heat transfer label assembly is provided. The method includes screen printing a protective layer onto a carrier layer, digitally printing one or more of a graphic or indicia above the protective layer, screen printing one or more additional layers above the one or more of the graphic or the indicia that are digitally printed, and applying an adhesive above the one or more additional layers to form a hybrid heat transfer label assembly.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
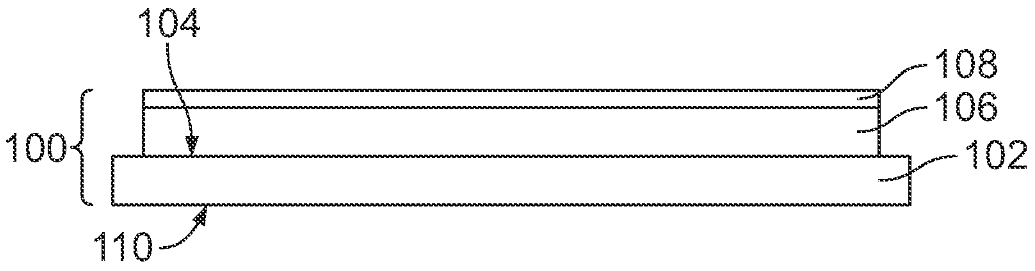
FIG. 1 illustrates one example of a hybrid heat transfer label assembly.

The inventive subject matter described herein provides hybrid heat transfer label assemblies and methods for manufacturing and applying the same. The label assemblies combine both digital and non-digital printing processes to provide the label assemblies that can be applied to a wide variety of surfaces while having the benefits of digital printing and non-digital printing. For example, with respect to digital printing part of the label assemblies, the images and/or indicia that are digitally printed can be higher quality, higher resolution, and more photorealistic than the same images and/or indicia printed using non-digital printing. The digitally printed images and/or indicia can be printed using a wide variety of colors, including (but not limited to) cyan, magenta, yellow, black, white, invisible (or translucent), taggant, spot colors, metallic colors, foils, fluorescents, clear matte, and gloss inks. These images and/or indicia can be printed in a single pass through a digital printer. This reduces re-insertions of the label assemblies when compared to some known printing methods. This also provides more reliable registration between colors that are digitally printed.

Digital printing also provides the ability to incorporate variable data, such as images and/or indicia that are different for each or at least several label assemblies. Variable designs, embellishments, effects, variable barcodes (e.g., 1D or 2D barcodes), quick response (QR) codes, sequential numbering, etc., can be digitally printed all in one pass through the digital printer.

Digital printing also provides the ability to incorporate security features into the label assemblies. These security features can include watermarks (which may be invisible to the naked or unmagnified eye), marks that are detectable by a scanner or mobile device, etc. These watermarks also or alternatively can be used to provide consumer engagement, brand authenticity, and track and trace functionality using marks that are almost imperceptible to the naked and unmagnified human eye. Invisible ultraviolet (UV) ink can be digitally printed into the label assemblies to provide covert identification, sequential numbering, and other variable data design. This type of ink can then be seen by exposing the label assembly using UV light. Machine taggant inks, magnetic inks, or other inks can be digitally printed into the label assemblies. These inks can be electronically detected and authenticated by hand held scanner. Additionally, other inks providing special effects, gloss, matte, foiling, embossing, etc. can be done in the label assembly on the same single printing pass on digital printer which further reduces the need for additional conventional screen print passes to create the desired effect. Using digital printing to provide some or all these inks can simplify the manufacturing process of the label assemblies by reducing the number of printing passes (e.g., the number of times that ink is applied to the same footprint or area above a carrier layer), time, and materials otherwise needed to create the same label assembly but using only non-digital printing processes.

The hybrid label assembly also obtains the benefits of the digital printing processes described above, as well as benefits provided by non-digital printing. The security features described herein optionally can be printed using one or more of the non-digital printing processes or techniques described herein. For example one or more layers in the assembly can be screen printed, which provides highly opaque back up layers (e.g., layers that are behind the digitally printed images and/or indicia when the label assembly is adhered to a garment), the addition of hard to match spot colors, extended gamut colors (or other colors that are not possible to obtain via digital printing), and the incorporation of metallic inks and the non-digitally printed security features described above. Additionally, the non-digital printing of one or more layers of the label assembly allows for the incorporation of different tie coat and/or adhesive layers for adhesion to a wide range of substrates (e.g., surfaces of articles), such as plastics (e.g., polyester, copolyester, polypropylene cosmetic containers and toothbrush handles; ABS, SAN, PS, and HIPS razor handles and appliance components; PVC for automotive visor labels, etc.); fabrics used for automotive visor labels and seat belt labels; engineering resins (e.g., polycarbonate, nylon and various blends); metal and painted metal appliance components and sports equipment; painted graphite sports equipment; glass; and rubber used for belts, hoses, tires, etc. The non-digitally printed layers can provide for improved durability of the underlying digitally printed images and/or indicia, such as scratch and abrasion resistance due to thicker deposits, as well as improved chemical resistance and durability through incorporation of a first down protective layer (e.g., a layer that is deposited between the carrier layer and the digitally printed layer, as described below).

A heat transfer label for application to various substrates includes a carrier (usually in the form of a roll-to-roll web or cut down into sheets), a release coat applied to the carrier, an optional protective layer applied to the release coat, and a composition including a digitally printed graphic design, a screen printed back-up layer(s) applied to the digitally printed graphic design, and an adhesive applied either directly to the digitally printed graphic design or to the screen printed back up layers. Depending upon the digital print engine, a tie layer may be screen printed between the digitally printed graphic design and any subsequent screen printed layers. The digitally printed design and screen printed layers are printed and cured to form a storable film on the carrier web. Some examples of screen printable inks suitable for use in this invention include solvent-based inks, water-based inks, UV curable inks as well as 100% solids inks as described by Downs et. al. U.S. Pat. No. 5,919,834 and Penrose et. al. US2019/0378438 A1. The composition is heat transferred to the substrate and the carrier web is removed. A method for making the label and a method for marking an item are also disclosed Hybrid heat transfer labels made using a combination of digital printing and at least one other conventional printing method, such as screen printing, are provided according to various embodiments. The hybrid heat transfer labels include a heat activated adhesive layer and an optional protective layer, which are printed via screen, flexographic, rotogravure, or pad printing method to provide excellent adhesion to a target article and good chemical and other environmental resistance. Further, the hybrid heat transfer labels include a digitally printed layer offering superior quality graphic images and markings that can be customized quickly and easily to provide cost effective specialty heat transfer labels.

The label assemblies described herein can be hybrid digital and screen printed heat transfer labels for application to a variety of surfaces, such as plastics, metals, glass, automotive fabrics and rubber compounds, fabrics for outdoor sporting and safety equipment, fabrics for medical use applications, and the like. One or more of the printers used to generate the label assemblies can include printers such as the HP INDIGO Liquid Electrophotographic digital offset presses, 'solid' or 'dry toner' printers or presses, water based pigment dye, sublimation or latex inkjet printers and presses, UV curable inkjet printheads and presses, vegetable or mineral oil based direct imaging offset lithographic or flexographic presses, etc.

FIG. 1 illustrates one example of a hybrid heat transfer label assembly 100. The assemblies shown in the Figures are not necessarily drawn to scale. One or more layers in the assemblies may be thicker or thinner than one or more other layers, even though the relative thicknesses of the layers shown in the Figures may show a different relative thickness. Stated differently, a first layer that is shown in a Figure as being thinner than a second layer may actually be thicker than the second layer.

The label assembly 100 includes a carrier layer 102 having an upper surface 104 that supports a multi-layered label 106 and an adhesive 108. As described herein, the multi-layered label 106 is formed on the upper surface 104 of the carrier layer 102 from several layers with at least one layer being digitally printed (e.g., by one or more digital printers in one or more passes) and at least one layer being non-digitally printed (e.g., screen printed, flexographic printed, gravure printed, rotogravure printed, pad printed, etc.).

The carrier layer 102 can be formed from a paper or plastic film. Suitable materials for the carrier layer 102 include polypropylene film, as well as polyester films, with polyester being more heat resistant. MYLAr® and MELINEX® are two trademarks under which these materials are commercially available. Paper is less costly than plastic films, however, the dimensional stability of paper is less desirable unless printing is conducted in a controlled environment with regard to temperature and relative humidity. The carrier layer 102 can be a release coated paper or plastic film. The release coating can be silicone based, or the release coating can include other coatings. In one embodiment, both surfaces 104, 110 of the carrier layer 102 are coated with release coatings, in which the release coatings have different release characteristics. For example, the printed surface 104 will generally have a tighter release than the non-printed surface 110, alternatively it could be the same release value to help prevent curling issues, or it could be on the print surface 104 only.

The adhesive 108 may be non-digitally printed onto the multi-layered label 106 or may be applied to the multi-layered label 106 as a powder or printable adhesive. For an example, the adhesive 108 may be applied to the multi-layered label 106 as a powder while an upper surface or layer on which the powder adhesive 108 is applied is wet. The adhesive 108 may be a heat activated adhesive, such as one or more powdered resins including polyamide, polyester, and polyurethane. Examples of polyamide resins include GRILTEX® IA and other polyamides from EMS-GRILTECH, a unit of EMS-CHEMIE, as well as UNEX®PA T11 and other polyamides from DAKOTA COATINGS N.V. Examples of polyester resins include GRILTEX® 6E and other polyesters from EMS-GRILTECH and UNEX®PES T6 and other polyesters from DAKOTA COATING N.V. Examples of polyurethane resins include UNEX® 4529 and other polyurethanes from DAKOTA COATINGS N.V. If applied as a powder, the adhesive powder resin can be dispersed in a resin solution, solvent, or water prior to application to create a printable adhesive.

The adhesive 108 may also be a non-digitally printed adhesive based on a combination of one or more rosin and/or one or more resins. These can be solvent-borne, water-borne or UV-curable. These can be heat-activated combinations of polyolefins, polyesters, polyacrylics, polyvinyl chloride/polyvinyl acetate (PVC/PVA) resins and terpene-based rosins. Examples of polyolefin-type resins can be ADVANTIS 510W, CP343 or others provided by EASTMAN CHEMICAL COMPANY as well as LICOCENE PP2602, LICOCENE PP MA4221 or others provided by CLARIANT PLASTICS & COATINGS LTD., a unit of CLARIANT INTERNATIONAL. Examples of polyesters can be AROPLAZ® 4097-WG4-55, FINE-TONE® T-6694 or others provided by REICHOLD, LLC as well as VITEL 2200B, VITEL 3300B or others provided by BOSTIK, INCORPORATED. Examples of polyacrylics can be PARALOID® B-48N or others provided by DOW COATING MATERIALS, a division of DOW CHEMICAL CORPORATION. PVC/PVA resins can be VINNOL® E 22/48A, VINNOL® H 15/50 of others provided by WACKER CHEMIE AG. Examples of terpene rosins include SYLVARES® 1095, SYLVARES® TR7125 or others from KRATON CORPORATION as well as STABELITE™ ESTER 10-E, LEWISOL™ 28-M and others from EASTMAN CHEMICAL COMPANY. These can be blended in varying percentages in solvent, water and/or liquid monomer prior to application to create a printable adhesive.

Figure 2:
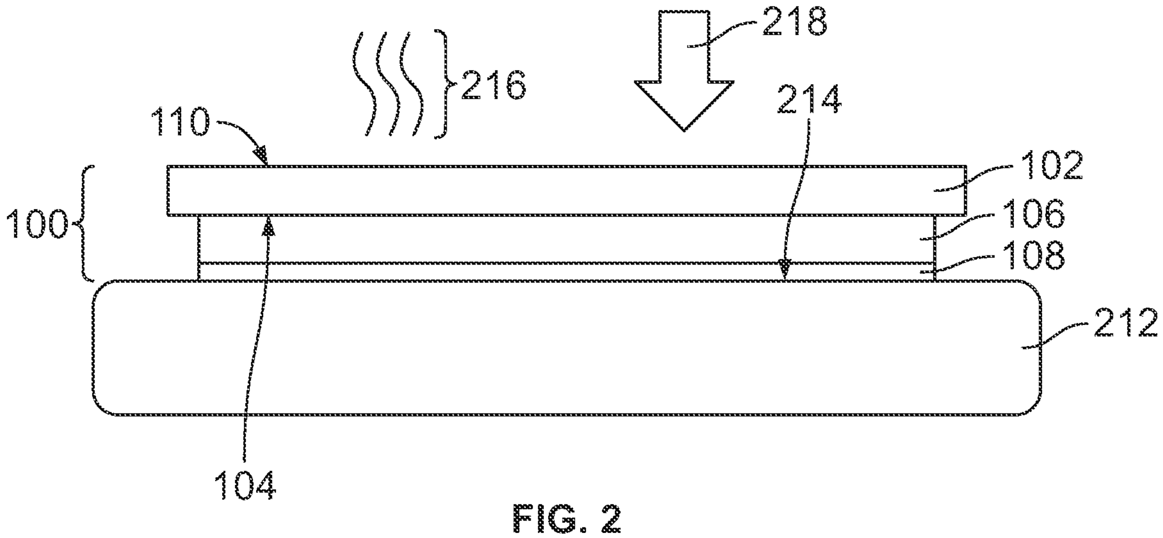
FIG. 2 illustrates application of the label assembly shown in FIG. 1 to an article.
Figure 3:
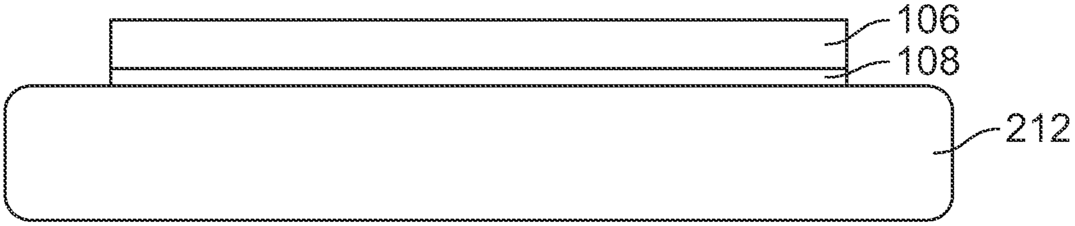
FIG. 3 also illustrates application of the label assembly shown in FIG. 1 to the article shown in FIG. 2.

FIGS. 2 and 3 illustrate application of the label assembly 100 shown in FIG. 1 to an article 212. The article 212 can represent an object to which the multi-layered label 106 is to be affixed, such as a garment, plastics such as a cosmetic or personal care object or container, a medical fabric, a sports fabric, a safety fabric, an automotive fabric, a rubber object, a vulcanized rubber object, a metal object, a fibrous object, a glass object, etc. The label assembly 100 is positioned onto the article 212 so that the adhesive 108 contacts a surface 214 of the article 212. Heat 216 or a combination of heat 216 and pressure 218 can be applied onto the non-printed surface 110 of the carrier layer 102 that is opposite the printed surface 104 of the carrier layer 102. As shown, the label assembly 100 may be flipped over relative to the perspective in FIG. 1 when applied to the article 212. The heat 216 or heat 216 and pressure 218 can cause the multi-layered label 106 to separate from the release coating of or on the carrier layer 102 and for the adhesive 108 to couple the multi-layered label 106 to the article 212.

For example, when the heat 216 or heat 216 and pressure 218 are applied, the adhesive 108 may soften and permanently adhere to the article 212. Since the adhesion strengths between the layers of the multi-layered label 106 are greater than that between the multi-layered label 106 and the carrier layer 102, the layers of the multi-layered label 106 remain attached to each other and transfer together to the article 212 upon application of the heat 216 or heat 216 and pressure 218, as shown in FIG. 3. After this heat transfer process, the carrier layer 102 is peeled off or otherwise removed from the multi-layered label 106 and the multi-layered label 106 is permanently attached on the article 212 via the adhesive 108, as shown in FIG. 3.

Each of the non-digitally printed layers and digitally printed layers described herein can be formed from a single printing pass or multiple printing passes. For example, any of the layers can be formed by a single pass of a digital printer or non-digital printer over the underlying layer(s), or can be formed by several successive printing passes (e.g., as multiple layers printed directly onto each other in the successive printing passes).

Figure 4:
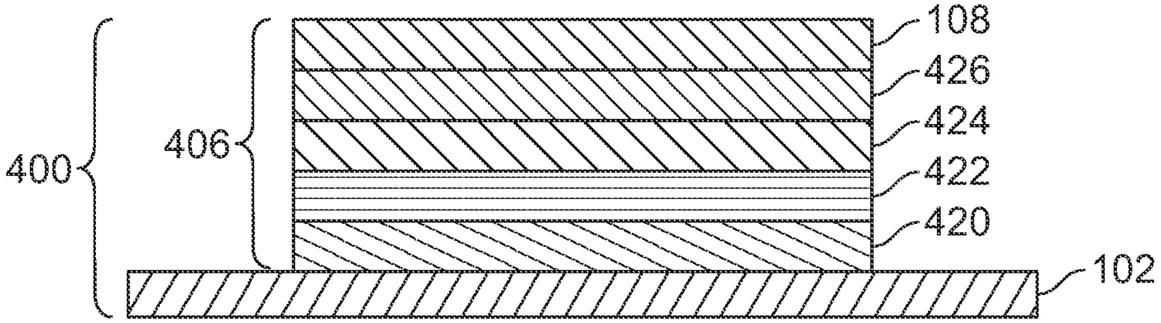
FIG. 4 illustrates one example of a hybrid heat transfer label assembly.

FIG. 4 illustrates one example of a hybrid heat transfer label assembly 400. The label assembly 400 can represent the label assembly 100 shown in FIGS. 1 and 2, and includes a multi-layered label 406 that can represent the multi-layered label 106 shown in FIGS. 1 through 3. The multi-layered label 406 can be formed (e.g., printed) onto the carrier layer 102 described above. The multi-layered label 406 includes a coated protective layer 420 that can be non-digitally printed directly onto the carrier layer 102. Optionally, part or all the protective layer 420 can be digitally printed onto the carrier layer 102. The protective layer 420 can be referred to as the first down layer. The protective layer 420 can be clear, translucent, light-transmissive, etc., so that one or more of the layers printed onto the protective layer 420 are visible through the protective layer 420 after the multi-layered label 406 is adhered to the article 212. The protective layer 420 can be formed from polymer material through which the one or more of the layers printed onto the protective layer 420 are visible.

For example, the protective layer 420 can be printed from a composition comprising about 82.6% by weight Estane®5703 resin solution (comprised of about 20% polyester type thermoplastic polyurethane in a cyclohexanone/ethyl 3-ethoxypropionate mixture) (Lubrizol Advanced materials, Inc.), about 9.9% CAB-381-20 resin solution (comprised of about 20% cellulose acetate butyrate in a cyclohexanone/ethyl 3-ethoxypropionate mixture) (Eastman Chemical Company), about 5% cyclohexanone (Ashland Inc.), about 2% Cab-O-Sil® TS-610 fumed silica (Cabot Corp), and about 0.5% TEGO® Foamex-N defoamer (Evonik industries AG). The above composition contains about 20.5%, by weight, solids and about 79.5%, by weight, VOCs. Optionally, the protective top clear can contain any of several crosslinking agents to improve the toughness and chemical resistance of the protective top clear, e.g. 5% of Desmodur® N-75 aliphatic polyisocyanate (Bayer Material Science). The term "about" includes the value stated above, as well as other values within manufacturing tolerances (e.g., within a 1% range, within a 2% range, or within a 3% range in different embodiments).

A surface treatment layer 422 can be printed onto the protective layer 420. The surface treatment layer 422 can be printed using a non-digital printing process described herein. Alternatively, part or all the surface treatment layer 422 can be digitally printed. The surface treatment layer 422 can be formed from one or more primers or coatings to provide a surface on which a digitally printed layer 424 can be digitally printed. For example, the protective layer 420 may be too smooth for the digital printer (e.g., an ink jet printer) to digitally print the digitally printed layer 424 directly onto the protective layer 420. The surface treatment layer 422 may provide a less smooth surface that is more receptive to the digitally printed inks of the digitally printed layer 424 (e.g., a higher or lower surface energy to prevent unintended smearing, beading or blending of the digitally or post-printed inks of an incompatible surface tension). Alternatively, the surface treatment layer 422 is not provided but the exposed surface of the protective layer 420 is treated to improve adhesion between the protective layer and the digitally printed layer 424. For example, instead of printing or coating the surface treatment layer 422 on the protective layer 420, the surface of the protective layer 420 (e.g., the surface that faces away from the carrier layer 102) can be treated to change energy of the surface (e.g., by changing the surface energy of the protective layer 420), to roughen, clean and prepare the surface, or the like, to thereby improve adhesion between the protective layer 420 and the digitally printed layer 424. The surface can be treated using one or more of a variety of techniques, such as by exposing the surface to a gas flame, exposing the surface to air plasma, using a corona treatment, exposing the surface to a chemical plasma, or the like.

The digitally printed layer 424 can include one or more inks that are digitally printed to form one or more images and/or indicia. As described above, these images can include variable data (e.g., different images and/or indicia for different labels) and/or non-variable data (e.g., the same image and/or indicia for each label). For example, the digitally printed layer 424 can include bar codes, variable embellishments and effects, QR codes, sequential numbering (e.g., between or among different labels), etc. The digitally printed layer 424 can include security features such as data and watermarks, watermarks with invisible marks for security detection (e.g., by hand held scanner or mobile device). The watermarks formed in the digitally printed layer 424 can be optically detected by an optical sensor (e.g., a camera on a mobile phone) and can cause the mobile device to take one or more actions, such as, performing a security validation check or loading a website connected with the article 212 to which the digitally printed layer 424 is eventually interconnected. The digitally printed layer 424 can include UV sensitive ink so that the images and/or indicia are only visible when exposed to UV light. The digitally printed layer 424 can include machine taggant inks or magnetic inks that can be electronically detected by a scanner. As another example, the digitally printed layer 424 can include inks that provide a unique effect, such as a gloss appearance, a matte appearance, a foil or metallic appearance, embossing, etc. These detectable designs, watermarks or inks can also be printed into the label by the non-digital parts of the process i.e. screen printing of the magnetic or coded inks, to provide a more reliable functionality or detection by increase of deposit thickness or visibility.

A tie layer 426 can be printed onto the digitally printed layer 424. Optionally, the tie layer 426 is not included in the label assembly 406. The tie layer 426 can be printed using anon-digital printing process, such as screen printing. The tie layer 426 assists in coupling the underlying layers 420, 422, 424 to the article 212 via the adhesive 108. The tie layer 426 can be formed from a polymeric material that softens and bonds with the article 212 when subjected to heat 216 or a combination of heat 216 and pressure 218. The adhesive 108 can be applied onto the tie layer 426 or onto the digitally printed layer 424 (if the tie layer 426 is not included in the label assembly 400).

Alternatively, the tie layer 426 and the adhesive 108 can be combined into a single layer. For example, the tie layer 426 and the adhesive 108 shown in FIG. 4 (and in other Figures where the tie layer 426 directly contacts or otherwise abuts the adhesive 108) may be replaced by a single layer representing a combination of the materials forming the tie layer 426 and the adhesive 108.

One or more surfaces of the label assembly 400 can be treated to change the energy, surface tension, or smoothness of the surfaces and thereby improve the adhesion of a layer to the treated surface. For example, surfaces of one or more of the layers 420, 422, 424, and/or 426 can be exposed to an air plasma (e.g., a corona treatment), chemical plasma, gas flame, or the like, to roughen the surface (e.g., on a microscopic scale), to change the surface tension of the layers 420, 422, 424, and/or 426, or to otherwise improve adhesion between the surface and another layer 420, 422, 424, or 426.

As described above, the label assembly 400 can be placed into contact with the article 212 such that the adhesive 108 contacts the surface 214 of the article 212. Heat 216 or a combination of heat 216 and pressure 218 is applied to the surface 110 of the carrier layer 102 to separate the label 406 from the carrier layer 102 and adhere the label 406 to the article 212. The label 406 can be adhered to articles 212 such as cosmetic containers, personal care products (e.g., toothbrushes, hairbrushes, etc.), other polymer surfaces, etc.

Figure 5:
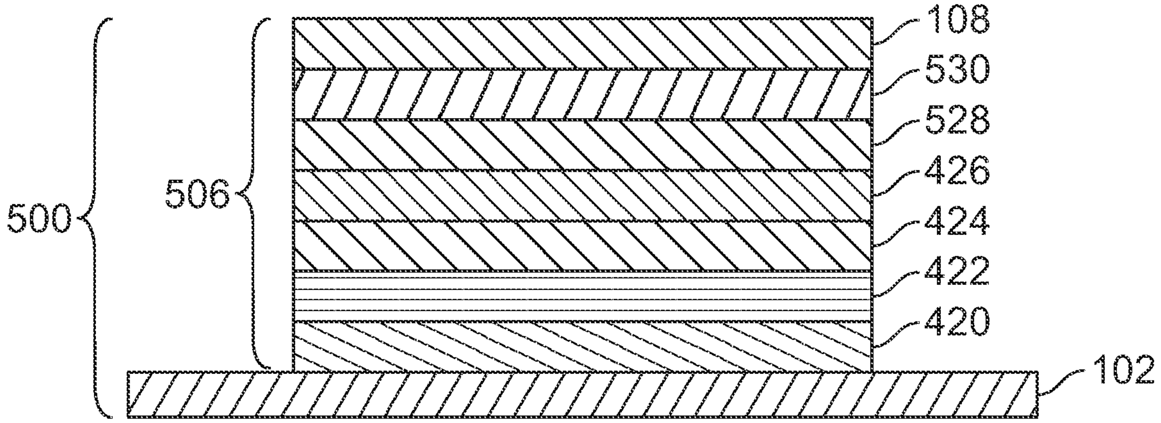
FIG. 5 illustrates another example of a hybrid heat transfer label assembly.

FIG. 5 illustrates another example of a hybrid heat transfer label assembly 500. The label assembly 500 can represent the label assembly 100 shown in FIGS. 1 and 2, and includes a multi-layered label 506 that can represent the multi-layered label 106 shown in FIGS. 1 through 3. The label assembly 500 and the label 506 can represent another embodiment of the label assembly 400 and the label 406 shown in FIG. 4. One difference between the label assemblies 400, 500 and the labels 406, 506 is the presence of an additional graphic layer 528 and, optionally, a backup or backer layer 530. The graphic layer 528 can be printed onto the tie layer 426 or onto the digitally printed layer 424 (if the tie layer 426 is not included in the label 506). The graphic layer 528 can include one or more images and/or indicia that are printed in a non-digital manner (e.g., using screen printing). The graphic layer 528 is printed above the digitally printed layer 424 such that the digitally printed layer 424 is on top of the graphic layer 528 once the label 506 is adhered to the article 212.

The graphic layer 528 can be printed using a non-digital technique, such as screen printing. The graphic layer 528 can be a layer of a solid (e.g., the same) color of ink, or may include different colored inks in different areas of the graphic layer 528. Optionally, the graphic layer 528 can include images and/or indicia. The digitally printed layer 424 overlaying the graphic layer 528 can provide for various appearances, such as a different background color (than the article 212), increased contrast between the digitally printed layer 424 and the article 212, or the like.

The backup layer 530 can be printed using a non-digital technique, such as screen printing. The backup layer 530 can be a layer of a solid (e.g., the same) color of ink, such as white, black, or the like. In one embodiment, the backup layer 530 is printed using a white pigment. For example, the backup layer 530 can be formed of a white ink formulation including a resin solution (formulated from 36.73 percent by weight ethyl 3-ethoxypropionate, 4.51 percent by weight cyclohexanone, 4.61 percent by weight Estane® 5703 thermoplastic polyurethane resin and 1.14 percent by weight CAB-381-20 cellulose ester resin), 1.84 percent by weight Nanomer® 1.28E nanoclay, white paste (formulated from 18.66 percent by weight ethyl 3-ethoxypropionate, 3.96 percent by weight cyclohexanone, 5.66 percent by weight Estane® 5703, and 18.86 percent by weight TIOXIDE® TR90 titanium dioxide), 0.86 percent by weight INEOS® IJI silica gel, 0.17 percent by weight TECO® Foamex N defoamer and 3.00 percent Desmodur® N-75 aliphatic polyisocyanate. The white ink can be screen printed through a stainless steel mesh, for example, with 270 lines per inch, on top of the tie layer 20. The white ink can be applied once or via multiple passes.

Optionally, the backup layer 530 can include images and/or indicia. The backup layer 530 can make the images, indicia, and/or colors of the digitally printed layer 424 and/or graphic layer 528 clearer and/or have increased contrast relative to the label 506 not including the backup layer 530. For example, the backup layer 530 can prevent the color of the underlying article 212 (once the label 506 is applied to the article 212) from strikethrough or making the images and/or indicia harder to see.

In another embodiment, the label assembly 500 does not include the surface treatment layer 422, the tie layer 426, and/or the backup layer 530. One or more surfaces of the label assembly 500 can be treated to change the energy of the surface(s), change the surface tension of the surface(s), or roughen the surfaces and thereby improve the adhesion of a layer to the treated surface, as described above.

The label assembly 500 can be placed into contact with the article 212 such that the adhesive 108 contacts the surface 214 of the article 212. Heat 216 or a combination of heat 216 and pressure 218 is applied to the surface 110 of the carrier layer 102 to separate the label 506 from the carrier layer 102 and adhere the label 506 to the article 212. The label 506 can be adhered to articles 212 such as cosmetic containers, personal care products (e.g., toothbrushes, hairbrushes, etc.), other polymer surfaces, etc.

Figure 6:
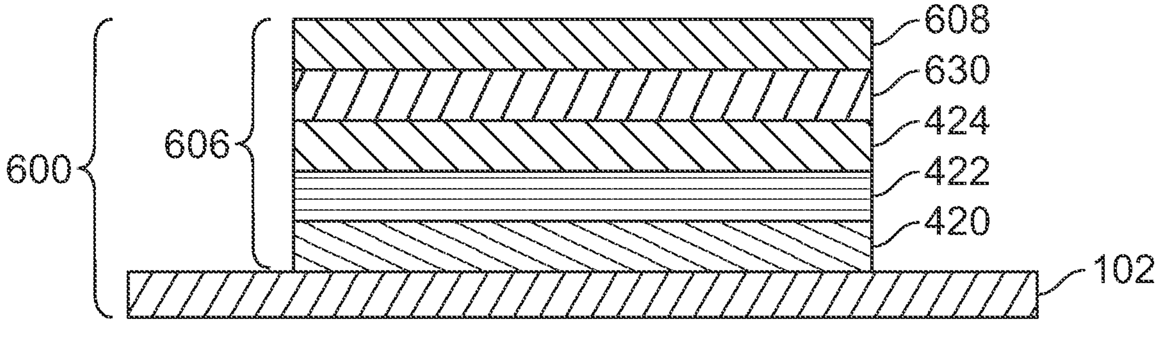
FIG. 6 illustrates another example of a hybrid heat transfer label assembly.

FIG. 6 illustrates another example of a hybrid heat transfer label assembly 600. The label assembly 600 can represent the label assembly 100 shown in FIGS. 1 and 2, and includes a multi-layered label 606 that can represent the multi-layered label 106 shown in FIGS. 1 through 3. As shown, the label assembly 600 includes the carrier layer 102, the protective layer 420 and the digitally printed layer 424, and optionally can include the surface treatment layer 422. In another embodiment, the label assembly 600 does not include the surface treatment layer 422.

The label assembly 600 includes a backup layer 630 that can be the same as the backup layer 530, except that the backup layer 530 can be formed from a single printing pass while the backup layer 630 can be formed from multiple printing passes. For example, the backup layer 530 can be printed from a single application of ink via screen printing while the backup layer 630 can be printed from several applications of ink via screen printing. As a result, the backup layer 630 may be thicker than the backup layer 530 and/or provide increased contrast between the digitally printed layer 424 and the underlying article 212. Alternatively, the backup layer 530 can be printed in multiple passes and/or the backup layer 630 can be printed in a single pass.

The label assembly 600 includes an adhesive 608 that can represent the adhesive 108. The adhesive 608 can be the same as the adhesive 108, except that the adhesive 108 can be formed from a single printing pass of the adhesive material while the adhesive 608 can be formed from multiple printing passes. For example, the adhesive 108 can be printed from a single application of adhesive via screen printing while the adhesive 608 can be printed from several applications of adhesive via screen printing. As a result, the adhesive 608 may be thicker than the adhesive 108 and/or provide increased adhesion or coupling to the underlying article 212. Alternatively, the adhesive 108 can be printed in multiple passes and/or the adhesive 608 can be printed in a single pass. One or more surfaces of the label assembly 600 can be treated to change the energy of the surface(s), change the surface tension of the surface(s), or roughen the surfaces and thereby improve the adhesion of a layer to the treated surface, as described above. For example, the surface of the As described above, the label assembly 600 can be placed into contact with the article 212 such that the adhesive 608 contacts the surface 214 of the article 212. Heat 216 or a combination of heat 216 and pressure 218 is applied to the surface 110 of the carrier layer 102 to separate the label 606 from the carrier layer 102 and adhere the label 606 to the article 212. The label 606 can be adhered to fabric articles 212, such as medical fabrics, sports and safety fabrics, automotive fabrics, and the like. The increased adhesive 608 can assist in keeping the label 606 affixed to the fabric (relative to the labels 406, 506).

Figure 7:
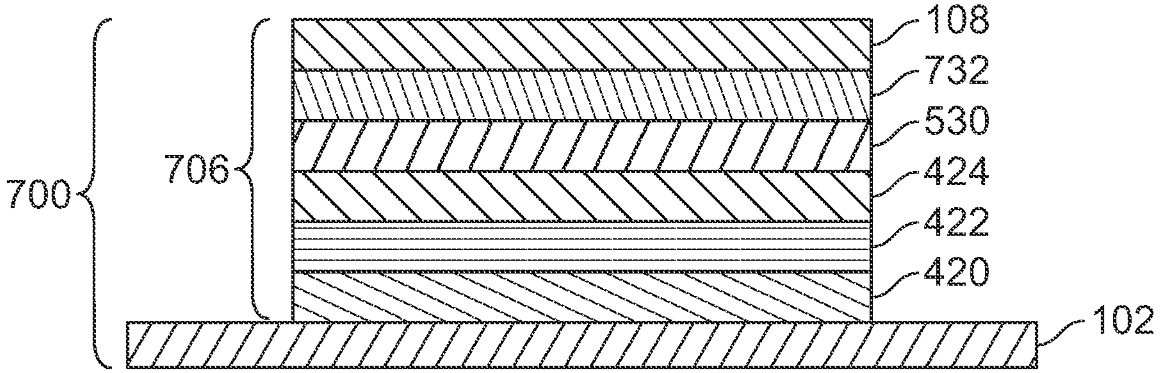
FIG. 7 illustrates another example of a hybrid heat transfer label assembly.

FIG. 7 illustrates another example of a hybrid heat transfer label assembly 700. The label assembly 700 can represent the label assembly 100 shown in FIGS. 1 and 2, and includes a multi-layered label 706 that can represent the multi-layered label 106 shown in FIGS. 1 through 3. As shown, the label assembly 700 includes the carrier layer 102, the protective layer 420, the digitally printed layer 424, the backup layer 530, and the adhesive 108, and optionally can include the surface treatment layer 422. In another embodiment, the label assembly 700 does not include the surface treatment layer 422.

The label assembly 700 includes a blocker layer 732 that can prevent dyes, stains, etc. migrating from the article 212 to the backup layer 530 and/or the digitally printed layer 424. The blocker layer 732 can be formed from the same materials as the protective layer 420 or from carbons, polyamides, acrylics or other polymers that can be applied in a non-digital printer and that can form a barrier to dyes, stains, etc. The blocker layer 732 can be printed onto the backup layer 530. This can help ensure that the color other features of the appearance of the digitally printed layer 424 and/or the backup layer 530 is not changed by dyes, stains, or the like, from the article 212. One or more surfaces of the label assembly 700 can be treated to change the energy of the surface(s), change the surface tension of the surface(s), or roughen the surfaces and thereby improve the adhesion of a layer to the treated surface, as described above.

The label assembly 700 can be placed into contact with the article 212 such that the adhesive 108 contacts the surface 214 of the article 212. Heat 216 or a combination of heat 216 and pressure 218 is applied to the surface 110 of the carrier layer 102 to separate the label 706 from the carrier layer 102 and adhere the label 706 to the article 212. The label 706 can be adhered to fabric articles 212, such as medical fabrics, sports and safety fabrics, automotive fabrics, and the like. The blocker layer 732 can help prevent sweat, bodily fluids, dyes, or other sources of stains from changing the appearance of the label 706.

Figure 8:
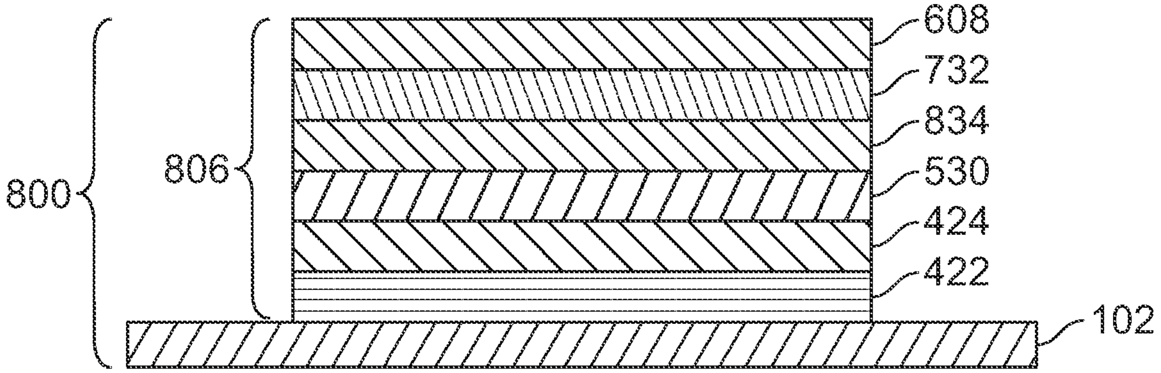
FIG. 8 illustrates another example of a hybrid heat transfer label assembly.

FIG. 8 illustrates another example of a hybrid heat transfer label assembly 800. The label assembly 800 can represent the label assembly 100 shown in FIGS. 1 and 2, and includes a multi-layered label 806 that can represent the multi-layered label 106 shown in FIGS. 1 through 3. As shown, the label assembly 800 includes the carrier layer 102, the digitally printed layer 424, the backup layer 530, the blocker layer 732, and the adhesive 608, and optionally can include the surface treatment layer 422. In another embodiment, the label assembly 700 does not include the surface treatment layer 422 and/or the blocker layer 732.

The label assembly 800 includes a tie layer 834 that can be printed (using a non-digital technique) onto the backup layer 530. For example, the tie layer 834 can be screen printed on the backup layer 530. The tie layer 834 can attach the underlying layers 102, 422, 424, 530, 834, where these layers are included, to the blocker layer 732. The tie layer 834 can be formed from a polymeric material that softens and bonds with blocker layer 732 when subjected to heat and pressure during transfer of the label 806 to the article 212. For example, the tie layer 834 can be formed from a lacquer or other light-transmissive (e.g., clear) material.

In one embodiment, the backup layer 530 can be a multiple strike or pass layer. For example, the backup layer 530 can be formed by several passes or printing operations instead of a single printing pass, as described above. One or more surfaces of the label assembly 800 can be treated to change the energy of the surface(s), change the surface tension of the surface(s), or roughen the surfaces and thereby improve the adhesion of a layer to the treated surface, as described above.

The label assembly 800 can be placed into contact with the article 212 such that the adhesive 608 contacts the surface 214 of the article 212. Heat 216 or a combination of heat 216 and pressure 218 is applied to the surface 110 of the carrier layer 102 to separate the label 806 from the carrier layer 102 and adhere the label 806 to the article 212. The label 806 can be adhered to fabric articles 212, such as medical fabrics, sports and safety fabrics, automotive fabrics, and the like. The blocker layer 832 can help prevent sweat, bodily fluids, dyes, or other sources of stains from changing the appearance of the label 806.

Figure 9:
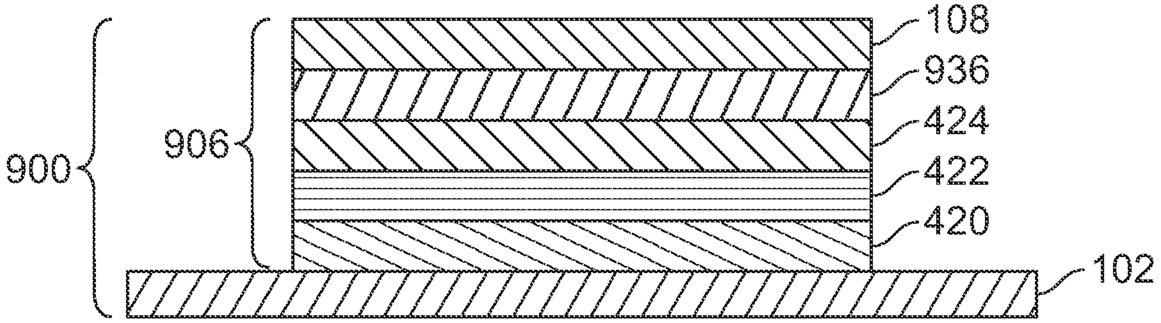
FIG. 9 illustrates another example of a hybrid heat transfer label assembly.

FIG. 9 illustrates another example of a hybrid heat transfer label assembly 900. The label assembly 900 can represent the label assembly 100 shown in FIGS. 1 and 2, and includes a multi-layered label 906 that can represent the multi-layered label 106 shown in FIGS. 1 through 3. As shown, the label assembly 900 includes the carrier layer 102, the surface treatment layer 422, the digitally printed layer 424, and the adhesive 108. In another embodiment, the label assembly 900 does not include the protective layer 420, the surface treatment layer 422 and/or the adhesive 108.

The label assembly 900 includes a rubber layer 936 that can be printed (using a non-digital technique) onto the digitally printed layer 424. For example, the rubber layer 936 can be formed from rubber or ink with rubber that is screen printed on the digitally printed layer 424. The rubber layer 936 can enable the label 906 to be adhered to a rubber surface as the article 212, such as an automotive component (e.g. a tire, hose or a belt) or other vulcanized material. The label 906 may be remain adhered to the rubber article 212 without the rubber layer 936 in one embodiment. The rubber layer 936 can be black or white in color to also function as a backer layer, as described above. Alternatively, the rubber layer 936 may have another color or combination of colors. One or more surfaces of the label assembly 900 can be treated to change the energy of the surface(s), change the surface tension of the surface(s), or roughen the surfaces and thereby improve the adhesion of a layer to the treated surface, as described above.

The label assembly 900 can be placed into contact with the article 212 such that the adhesive 108 or the rubber layer 936 contacts the surface 214 of the article 212. Heat 216 or a combination of heat 216 and pressure 218 is applied to the surface 110 of the carrier layer 102 to separate the label 906 from the carrier layer 102 and adhere the label 906 to the article 212. The label 906 can be adhered to rubber or vulcanized articles 212, such as automotive hoses, tires, or the like.

Figure 10:
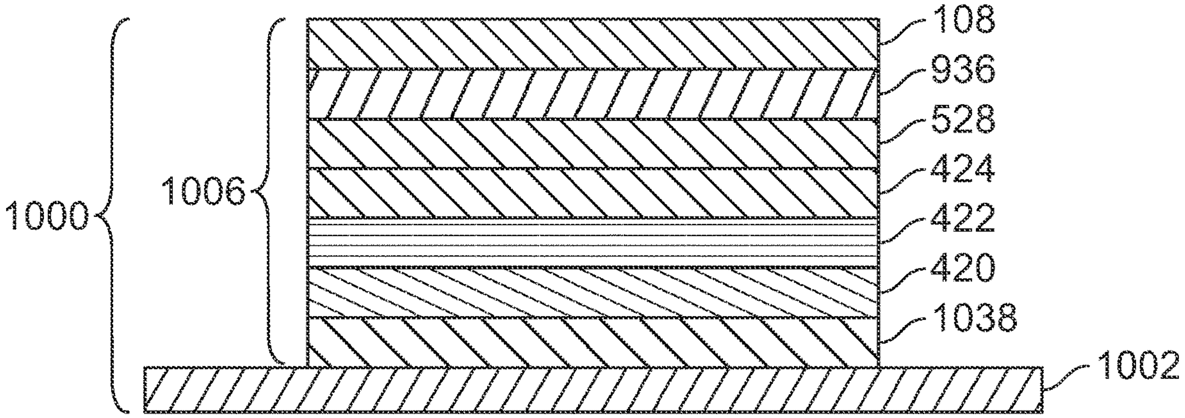
FIG. 10 illustrates another example of a hybrid heat transfer label assembly.

FIG. 10 illustrates another example of a hybrid heat transfer label assembly 1000. The label assembly 1000 can represent the label assembly 100 shown in FIGS. 1 and 2, and includes a multi-layered label 1006 that can represent the multi-layered label 106 shown in FIGS. 1 through 3. As shown, the label assembly 1000 includes a carrier layer 1002, the surface treatment layer 422, the digitally printed layer 424, the tie layer 426, the additional graphic layer 528, the rubber layer 936, and the adhesive 108. In another embodiment, the label assembly 1000 does not include the protective layer 420, the surface treatment layer 422 and/or the additional graphic layer 528.

The carrier layer 1002 can be carrier layer 102 shown in FIGS. 1 through 3 but without a release coating already on the carrier layer 1002. For example, while the carrier layer 102 may be obtained with the release coating already present on the carrier layer 102, the carrier layer 1002 may not have any release coating. A release coating 1038 can be printed (e.g., in a non-digital way, such as via screen, gravure or flexographic printing) onto the carrier layer 1002. For example, silicone, wax, or other materials that release the carrier layer 1002 from the other layers 420, 422, 424, 528, and/or 936 may be added to the carrier layer 1002. One or more surfaces of the label assembly 1000 can be treated to change the energy of the surface(s), change the surface tension of the surface(s), or roughen the surfaces and thereby improve the adhesion of a layer to the treated surface, as described above.

The label assembly 1000 can be placed into contact with the article 212 such that the adhesive 108 or the rubber layer 1036 contacts the surface 214 of the article 212. Heat 216 or a combination of heat 216 and pressure 218 is applied to the surface 110 of the carrier layer 102 to separate the label 1006 from the carrier layer 102 and adhere the label 1006 to the article 212. The label 1006 can be adhered to rubber articles 212, such as automotive belts, hoses, tires, or the like.

Figure 11:
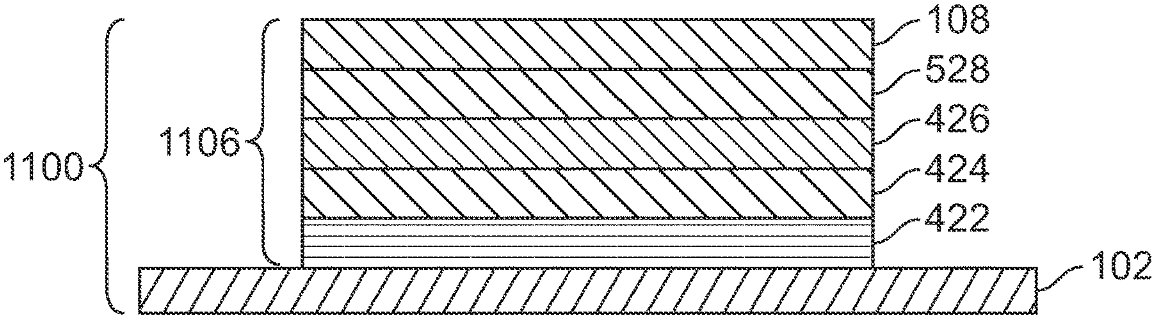
FIG. 11 illustrates another example of a hybrid heat transfer label assembly.

FIG. 11 illustrates another example of a hybrid heat transfer label assembly 1100. The label assembly 1100 can represent the label assembly 100 shown in FIGS. 1 and 2, and includes a multi-layered label 1106 that can represent the multi-layered label 106 shown in FIGS. 1 through 3. As shown, the label assembly 1100 includes the carrier layer 102, the surface treatment layer 422, the digitally printed layer 424, the tie layer 426, the additional graphic layer 528, and the adhesive 108. In another embodiment, the label assembly 1100 does not include the surface treatment layer 422, the tie layer 426, and/or the additional graphic layer 528. One or more surfaces of the label assembly 1100 can be treated to change the energy of the surface(s), change the surface tension of the surface(s), or roughen the surfaces and thereby improve the adhesion of a layer to the treated surface, as described above.

The label assembly 1100 can be placed into contact with the article 212 such that the adhesive 108 contacts the surface 214 of the article 212. The article 212 can be formed of metal, fiber, or glass, and/or the surface 214 of the article 212 may include metal, fiber, or glass. Heat 216 or a combination of heat 216 and pressure 218 is applied to the surface 110 of the carrier layer 102 to separate the label 1106 from the carrier layer 102 and adhere the label 1106 to the pre-heated article 212.

Figure 12:
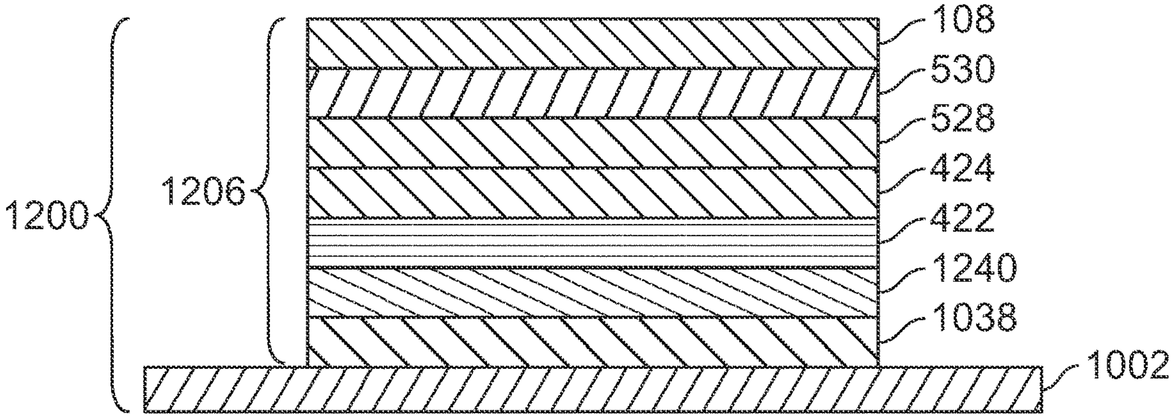
FIG. 12 illustrates another example of a hybrid heat transfer label assembly.

FIG. 12 illustrates another example of a hybrid heat transfer label assembly 1200. The label assembly 1200 can represent the label assembly 100 shown in FIGS. 1 and 2, and includes a multi-layered label 1206 that can represent the multi-layered label 106 shown in FIGS. 1 through 3. As shown, the label assembly 1200 includes the uncoated carrier layer 1002, the release layer 1038, a protective or special effects layer 1240, the surface treatment layer 422, the digitally printed layer 424, the additional graphic layer 528, the backup layer 530, and the adhesive 108. In another embodiment, the label assembly 1200 does not include the surface treatment layer 422, the additional graphic layer 528, and/or the backup layer 530.

The protective or special effects layer 1240 can include one or more materials that add a gloss appearance to the underlying digitally printed layer 424 or a matte appearance to the underlying digitally printed layer 424. Optionally, the special effects layer 1240 can include a metal foil (or HRI High Reflective Index ZnS foil) to provide a metallic appearance to the label 1206. This metal foil may be sufficiently thin that the digitally printed layer 424 is visible through the layer 1240 once the label 1206 is applied to the article 212 and the carrier layer 1002 is removed. The special effects layer 1240 can be an embossed layer that has one or more graphics or indicia embossed into the layer 1240. The special effects layer 1240 can be digitally printed using the same digital printer that prints the digitally printed layer 424 or using another digital or analogue printing method. Alternatively, the layer 1240 can be the protective layer 420. One or more surfaces of the label assembly 1200 can be treated to change the energy of the surface(s), change the surface tension of the surface(s), or roughen the surfaces and thereby improve the adhesion of a layer to the treated surface, as described above.

The label assembly 1200 can be placed into contact with the article 212 such that the adhesive 108 contacts the surface 214 of the article 212. The article 212 can be formed of metal, fiber, or glass, and/or the surface 214 of the article 212 may include metal, fiber, or glass. Heat 216 or a combination of heat 216 and pressure 218 is applied to the surface 110 of the carrier layer 102 to separate the label 1206 from the carrier layer 102 and adhere the label 1206 to the article 212.

Figure 13:
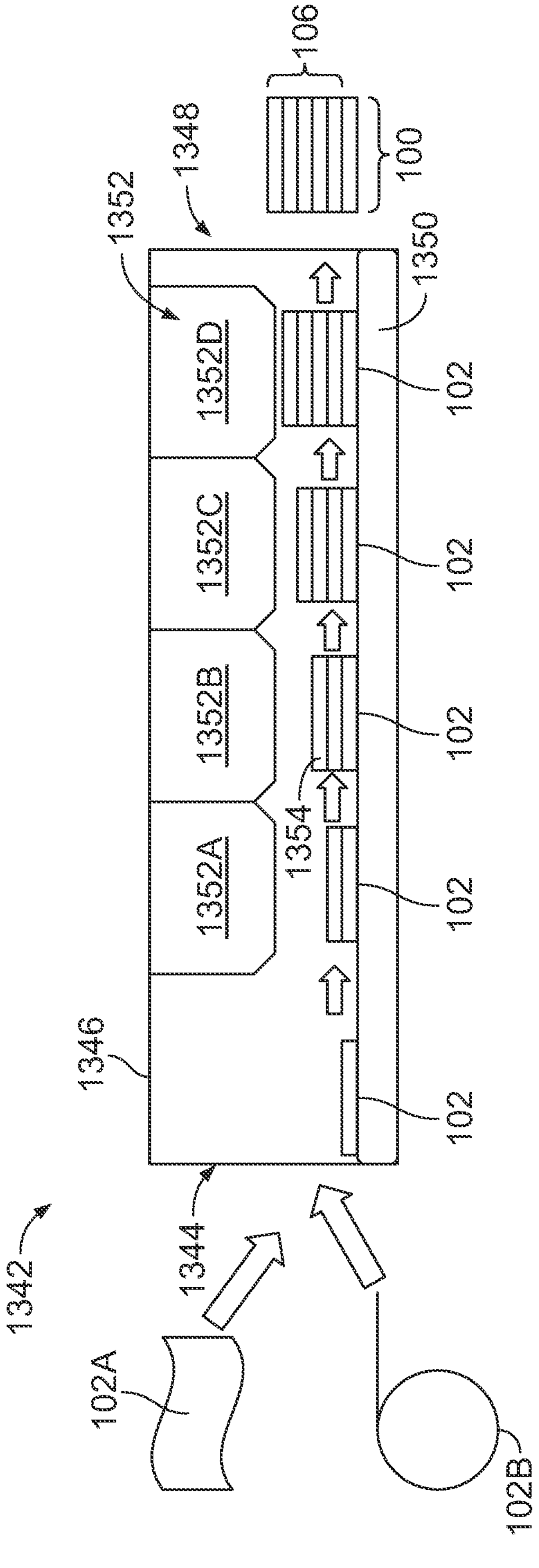
FIG. 13 illustrates one example of an in-line printing system that can be used to create one or more of the hybrid digital heat transfer label assemblies described herein.

FIG. 13 illustrates one example of an in-line printing system 1342 that can be used to create one or more of the hybrid digital heat transfer label assemblies described herein. The in-line printing system 1342 can print several or all of the layers in the label assembly 100 without removing the partially formed label assembly from the printing system 1342. For example, the carrier layer 102 of the label assembly 100 can be inserted into the printing system 1342 in an input end 1344 of an outer housing 1346 of the printing system 1342 and not removed from the housing 1346 of the printing system 1342 (via an outlet end 1348 of the housing 1346) until manufacture of the label assembly 100 is complete.

For example, the carrier layer 102 can be provided as individual sheets 102A (e.g., in sheet form) or as a continuous roll 102B (e.g., in roll form) into the printing system 1342. One or more conveyors, cylinders or rollers 1350 can carry the carrier layer 102 to and/or through several printers 1352 (e.g., printers 1352A-E). The number of printers 1352 is provided as one example. Each of the printers 1352 can print one or more additional layers 1354 onto the carrier layer 102 and/or other layers 1354 already on the carrier layer 102, as shown in FIG. 13. The layers 1354 can represent the layers 420, 422, 424, 426, 528, 530, 608, 630, 732, 834, 936, 1002, 1038, and/or 1240, as described above.

At least one of the printers 1352 can be a digital printer (e.g., an ink jet printer) while at least one other printer 1352 can be a printer that is not a digital printer (e.g., a screen printer). For example, a digital printer (e.g., 1352B) can be disposed downstream of one non-digital printer (e.g., 1352A) and upstream of another non-digital printer (e.g., 1352C) such that the digitally printed layer printed by the digital printer is disposed between the non-digitally printed layers. Optionally, one or more of the printers 1352 can include and/or one or more of the printers 1352 can represent a heating device that heats, dries, and/or cures the uppermost layer on the carrier layer 102 as the layers on the carrier layer 102 pass through the printer 1352 or heating device. Examples of such a heating device include air impingement driers, ovens, infrared lamps, or the like.

As shown, the carrier layer 102 passes through or beneath the printers 1352 so that the various layers in the label assembly 100 are sequentially printed without removing the carrier layer 102 or the printed layers from the printing system 1342. As described above, one or more of the printers 1352 may deposit a layer in a single pass or strike, or by depositing the layer in multiple passes or strikes. Once the layers forming the label 106 are printed onto the carrier layer 102, the label 106 (in roll or sheet form) may be removed from the printing system 1342. The in-line printing system 1342 can form the label assembly 100 and decrease the number of times that the label assembly 100 is handled by an operator, thereby decreasing registration errors between the layers, reducing printing time, and the like.

Figure 14:
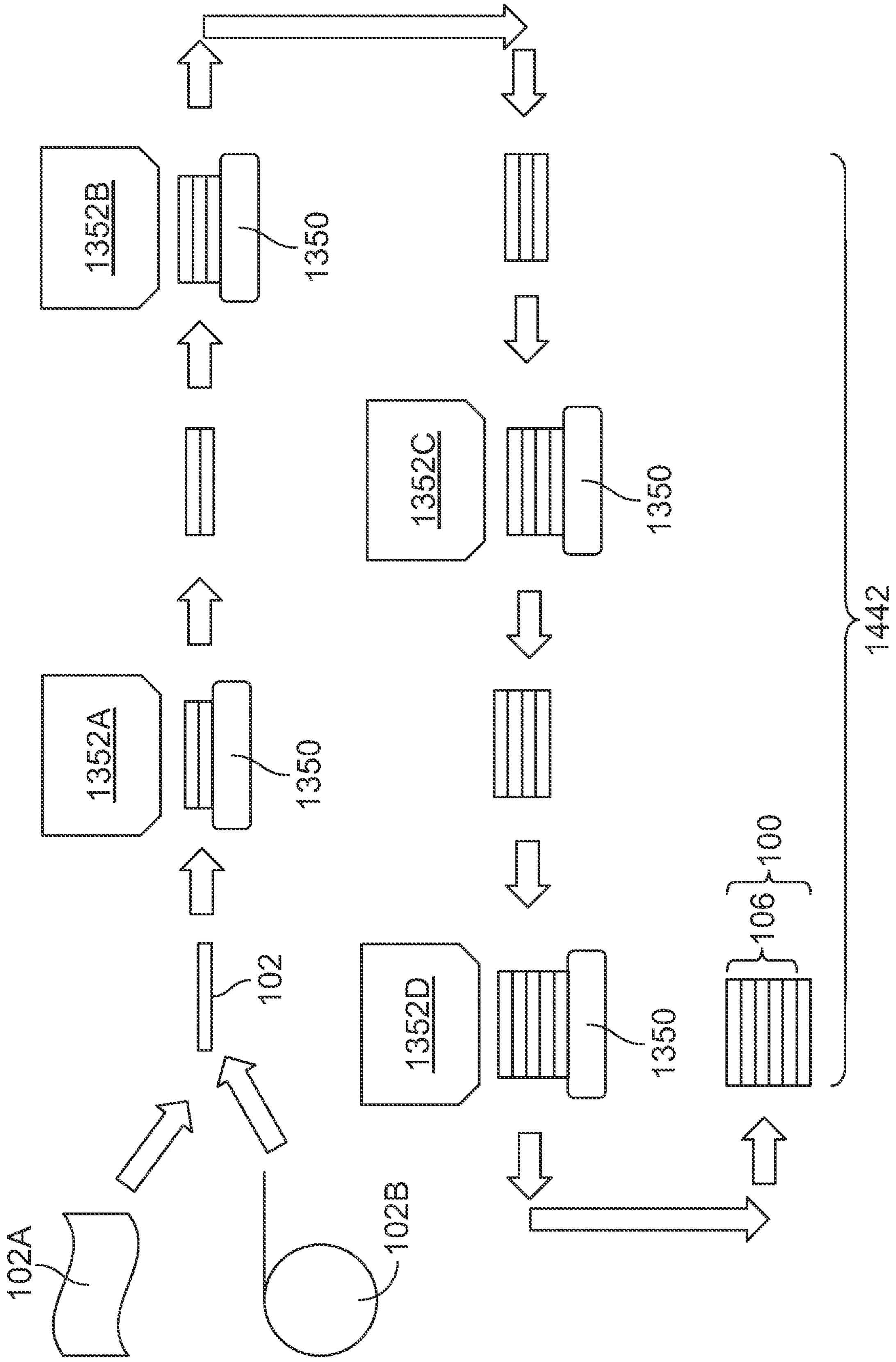
FIG. 14 illustrates another example of a printing system that can be used to create one or more of the hybrid digital heat transfer label assemblies described herein.

FIG. 14 illustrates another example of a printing system 1442 that can be used to create one or more of the hybrid digital heat transfer label assemblies described herein. In contrast to the in-line printing system 1342, the printing system 1442 has two or more separate printers 1352 that do not directly supply the carrier layer 102 (and any printed layers) from one printer 1352 to the next printer 1352. Instead, the carrier layer 102 and any printed layers are removed from one printer 1352 (e.g., by an operator of the printing system 1442) and then inserted into the next printer 1352.

A method for creating a hybrid heat transfer label assembly can include obtaining a carrier layer. The method can be used to create one or more of the label assemblies described herein. If the carrier layer does not include a release coating or layer, the method can include subsequently printing (e.g., in a non-digital manner) a release coating or layer onto the carrier layer. The method also can include subsequently printing, in a non-digital manner, one or more underlying layers on the carrier layer (with the release coating). These underlying layers can include one or more of the protective layer, the surface treatment layer, and/or the special effects layer.

The method includes subsequently digitally printing one or more images and/or indicia on the underlying layer(s). These images and/or indicia can be the digitally printed layer described above. The method includes subsequently printing (e.g., in a non-digital manner) one or more additional layers on the digitally printed layer. These additional layers can include the tie layer, the adhesive, the additional graphic layer, the backup layer, the blocker layer, and/or the rubber layer described above. This forms one or more of the label assemblies described herein.

In one embodiment, a hybrid heat transfer label assembly is provided. The label assembly includes a carrier layer, a non-digitally printed protective layer disposed above the carrier layer, a digitally printed layer disposed above the non-digitally printed protective layer, and a non-digitally printed layer disposed above the digitally printed layer. The non-digitally printed protective layer, the digitally printed layer, and the non-digitally printed layer form a label that is configured to separate from the carrier layer and adhere to an article upon application of heat to the carrier layer.

Optionally, the digitally printed layer is visible through the non-digitally printed protective layer once the label is adhered to the article.

Optionally, the non-digitally printed layer includes an adhesive.

Optionally, the non-digitally printed layer includes a tie layer.

Optionally, the non-digitally printed layer includes a screen printed graphic layer.

Optionally, the non-digitally printed layer includes a screen printed backup layer.

Optionally, the non-digitally printed layer includes a blocker layer that prevents stains from migrating from the article to the digitally printed layer.

Optionally, the non-digitally printed layer includes a lacquer layer.

Optionally, the non-digitally printed layer includes a rubber layer.

Optionally, the non-digitally printed layer is a first non-digitally printed layer, and the label assembly also can include a second non-digitally printed layer disposed above the first non-digitally printed layer and the digitally printed layer.

A method for producing a hybrid heat transfer label assembly also is provided. The method includes printing a protective layer above a carrier layer using a first non-digital printer, digitally printing a digitally printed layer above the non-digitally printed protective layer, and printing a non-digitally printed layer above the digitally printed layer using the first non-digital printer or a second non-digital printer. The protective layer, the digitally printed layer, and the non-digitally printed layer form a label that is configured to separate from the carrier layer and adhere to an article upon application of heat to the carrier layer.

Optionally, the protective layer is printed as one or more of a clear, a translucent, or a light-transmissive layer.

Optionally, the protective layer and the non-digitally printed layer are screen printed.

Optionally, the non-digitally printed layer is printed using an adhesive.

Optionally, the non-digitally printed layer is printed as a tie layer.

Optionally, the non-digitally printed layer is screen printed as a graphic layer.

Optionally, the non-digitally printed layer is screen printed as a backup layer.

Optionally, the non-digitally printed layer is printed as a blocker layer that prevents stains from migrating from the article to the digitally printed layer.

Optionally, the non-digitally printed layer is printed using a lacquer.

In another embodiment, another method for producing a hybrid heat transfer label assembly is provided. The method includes screen printing a protective layer onto a carrier layer, digitally printing one or more of a graphic or indicia above the protective layer, screen printing one or more additional layers above the one or more of the graphic or the indicia that are digitally printed, and applying an adhesive above the one or more additional layers to form a hybrid heat transfer label assembly.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related.

Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising: non-digitally printing a surface treatment layer above a protective special effects layer that is on a polymer carrier layer, the surface treatment layer providing a first surface that is less smooth than a second surface of the protective special effects layer, and the protective special effects layer having a metal foil; digitally printing a digitally printed layer on the first surface of the surface treatment layer and above the protective special effects layer; and printing a non-digitally printed layer above the digitally printed layer using a non-digital printer, wherein the protective special effects layer, the digitally printed layer, and the non-digitally printed layer form a label with the digitally printed layer visible through the protective special effects layer and the label configured to separate from the polymer carrier layer and adhere to an article upon application of heat to the carrier layer.

2. The method of claim 1, wherein the protective special effects layer is one or more of a clear, a translucent, or a light-transmissive layer.

3. The method of claim 1, wherein the non-digitally printed layer is screen printed.

4. The method of claim 1, wherein the non-digitally printed layer is printed using an adhesive or is printed as a combination of a tie layer and the adhesive.

5. The method of claim 1, wherein the non-digitally printed layer is printed as a tie layer.

6. The method of claim 1, wherein the non-digitally printed layer is screen printed as a graphic layer.

7. The method of claim 1, wherein the non-digitally printed layer is screen printed as a backup layer having one or more of images or indicia that increase contrast of the digitally printed layer.

8. The method of claim 1, wherein the non-digitally printed layer is printed as a blocker layer that is formed from a same material as the protective special effects layer and that prevents stains from migrating from the article to the digitally printed layer.

9. The method of claim 1, wherein the non-digitally printed layer is printed using a lacquer.

10. The method of claim 1, further comprising:

roughening the first surface of the protective special effects layer on which the digitally printed layer is digitally printed.

11. The method of claim 1, wherein the non-digitally printed layer is printed using taggant inks.

12. The method of claim 1, wherein the non-digitally printed layer is printed through multiple passes of the non-digital printer over the digitally printed layer.

13. The method of claim 1, further comprising:

embossing the metal foil in the protective special effects layer.

* * * * *